United States Patent
Kukreja et al.

(10) Patent No.: US 11,050,618 B1
(45) Date of Patent: Jun. 29, 2021

(54) REPLICATION OF DOMAIN CONTROLLER SETTINGS

(71) Applicant: Amazon Technologies, Inc., Seattle, WA (US)

(72) Inventors: Dinesh Ramesh Kukreja, Seattle, WA (US); Ameya Chikodi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/710,396

(22) Filed: Dec. 11, 2019

(51) Int. Cl.
*H04L 12/24* (2006.01)
*H04L 29/12* (2006.01)
*H04L 29/06* (2006.01)

(52) U.S. Cl.
CPC ...... *H04L 41/0816* (2013.01); *H04L 41/0686* (2013.01); *H04L 61/1511* (2013.01); *H04L 63/105* (2013.01)

(58) Field of Classification Search
None
See application file for complete search history.

(56) References Cited

U.S. PATENT DOCUMENTS

| 7,080,371 B1 * | 7/2006 | Arnaiz | G06F 8/65 717/168 |
| 8,676,958 B1 * | 3/2014 | Hendon | H04L 43/0817 709/224 |
| 2013/0036212 A1 * | 2/2013 | Jibbe | H04L 69/40 709/223 |

* cited by examiner

*Primary Examiner* — Jeffrey R Swearingen
(74) *Attorney, Agent, or Firm* — Nicholson De Vos Webster & Elliott LLP

(57) ABSTRACT

Techniques for replication of domain controller settings are described. A method for replicating domain controller settings may include identifying at least one event for a directory service implemented in a provider network, obtaining event data associated with the at least one event, the event data including a settings change, and replicating the settings change associated with the at least one event to a plurality of domain controllers of the directory service based on the event data associated with the at least one event, each of the plurality of domain controllers located in a different availability zone of the provider network.

20 Claims, 8 Drawing Sheets

REPLICATION OF DOMAIN CONTROLLER SETTINGS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for replication of domain controller settings across areas. According to some embodiments, a customer's directory service may be implemented in multiple availability zones of a provider network, and each availability zone may need its own domain controller to manage the customer's domain. Customer settings for their directory service need to be kept consistent across the domain controllers of the directory service to ensure that each domain controller can provide the same features across the customer's directory service. Embodiments enable settings to be instated across domain controllers and provide techniques to apply any settings to each domain controller. Some features, such as multi-factor authentication, establishing trust with other directories, etc. may not be automatically propagated to each domain controller. As such, embodiments provide a domain controller update service to ensure that settings changes are instated to each domain controller in a customer's directory service.

Figure 1:
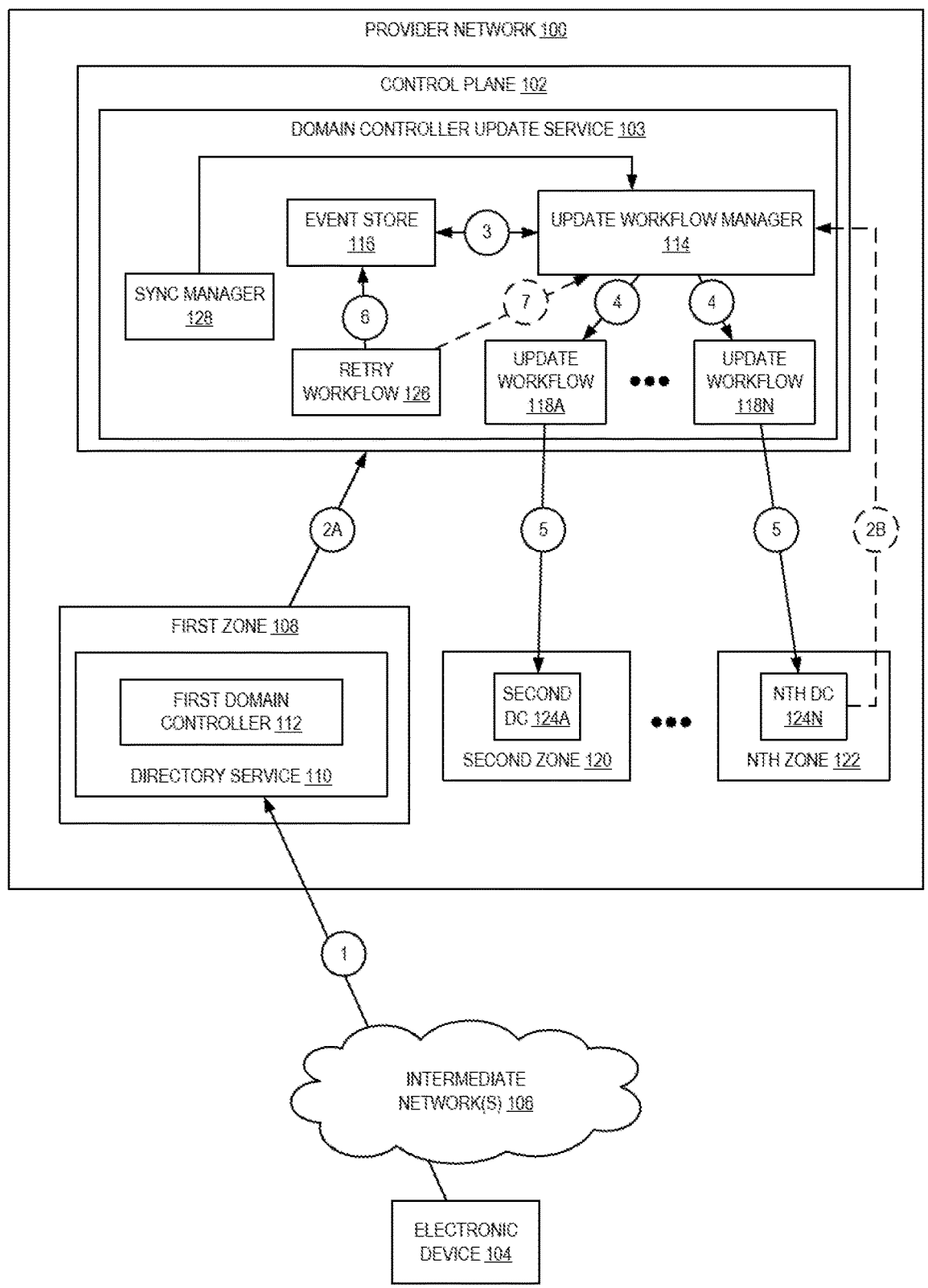
FIG. 1 is a diagram illustrating an environment for pushing domain controller settings to domain controllers in different areas of a provider network according to some embodiments.

FIG. 1 is a diagram illustrating an environment for pushing domain controller settings to domain controllers in different areas of a provider network according to some embodiments. As shown in FIG. 1, a provider network may provide a directory service 110, which manages various domain services, such as mapping names of a customer's resources to network addresses, authenticating and/or authorizing users, enforcing security policies, etc. In various embodiments, directory service 110 may include domain controllers in multiple availability zones 108, 120, 122 which may each manage domain services in its corresponding availability zone. To effectively manage a customer's domains, these domain controllers need to be kept synchronized at least with respect to settings. Some settings may not be readily replicated across domain controllers in different availability zones. As such, various techniques are described for applying settings to domain controllers in different availability zones to ensure all of the domain controllers provide the same features across a customer's domain.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

A cloud provider network can be formed as a number of regions where a region may be a geographical area in which the cloud provider clusters data centers. Each region can include multiple (e.g., two or more) availability zones (AZs), such as availability zones 108, 120, 122, connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network). Although examples are described with respect to domain controllers in different regions, in various embodiments, different AZs may each have their own domain controller which may be similarly updated using the techniques described herein.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

In some embodiments, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a user, using electronic device 104, can send a request to a directory service 110 to update one or more settings of the directory service, at numeral 1. In various embodiments, the request may be sent from electronic device 104 over one or more intermediate networks 106 to directory service 110 hosted in a first availability zone 108 of provider network 100. The request may be sent using an application programming interface (API) request to change the settings. For example, an API may be provided to add or remove IP address ranges managed by the directory service, and/or an API may be provided to enable/disable/modify multifactor authentication settings or other security settings, etc. Such customer-generated calls may be referred to as direct intrusive events and may result in settings changes that are to be replicated to all of the customer's domain controllers.

In some embodiments, in the course of processing the API call by the domain service, a request can be sent to control plane 102, at numeral 2A, to cause domain controller update service 103 to replicate the settings change(s) to all of the customer's domain controllers. Additionally, or alternatively, an indirect intrusive event that is experienced by one or more of the domain controllers may result in a request. Indirect intrusive events may include events generated by the directory service itself due to, e.g., disaster recovery of a domain controller, restoring a domain controller, scaling, etc. For indirect intrusive events, a request can be sent as part of the workflow that lead to the intrusive event. For example, when disaster recovery is performed on a domain controller, at the end of the recovery workflow when the domain controller is brought back online, a request can be sent to the control plane 102, at numeral 2B, to replicate settings to the recovered domain controller 124N.

In some embodiments, the update workflow manager 114 can identify intrusive events. For example, the update workflow manager can be triggered by the receipt of a request to replicate settings changes to one or more domain controllers in a customer's directory. When a request to replicate settings is received by domain controller update service 103 in control plane 102, an update workflow manager 114 can be launched. The update workflow manager 114 may be responsible for calling one or more update workflows 118A-118N to replicate settings changes associated with the event to one or more domain controllers (DC) in other availability zones, such as second DC 124A to Nth DC 124N.

In some embodiments, the update workflow manager can create an event for the intrusive event in event store 116, at numeral 3. The update workflow manager 114 can also gather settings related data which may be provided as part of the request to replicate settings to one or more domain controllers. In some embodiments, the event entry in the event store 116 may include one or more of the settings being changed (e.g., represented as a JSON file or other settings file), a list of domain controllers to which to apply settings updates (e.g., by IP address or other identifier), the type of event (e.g., direct or indirect), an attempt count, an identifier for the workflow, a start time, and an update status (e.g., running, closed, failed, terminated, etc.). At numeral 4, the update workflow manager 114 can call one or more update workflows 118A0118N. For example, for a direct intrusive event, an update workflow can be called for each domain controller in a customer's directory while an indirect intrusive event may call only update workflows for the affected domain controllers.

At numeral 5, each update workflow 118A-118N can check the existing settings on the domain controller and determine a difference in settings between the new settings to be applied and the existing settings of the domain controller. Each update workflow can then apply the difference between the existing settings and the new settings to its corresponding domain controller 124A-124N. For example, each update workflow can send an update settings API request to its corresponding domain controller. The request may include the settings changes provided by the update workflow manager 114. In some embodiments, each update workflow can verify that the settings were applied to the corresponding domain controller. In some embodiments, each update workflow can provide a status response to the update workflow manager. If the settings were successfully applied, the update workflow manager can clear the corresponding entry from the event store. If any of the update workflows were unsuccessful, the update workflow manager can call a new update workflow to attempt to apply the settings again. This may continue until the settings are successfully applied or until an end condition, such as a timeout, a maximum number of attempts, or other condition, is reached.

In some embodiments, the update workflow manager can poll the intrusive events from event store 116 periodically to determine whether a new workflow needs to be launched and can periodically check the settings on each domain controller to ensure the settings have been applied. In some embodiments, update workflow manager can monitor the workflows and retry any which have failed due to a fault in the domain controller, domain controller update service, directory service, or other fault that is not the result of an action by the customer. This timer task can retry launching the update workflow manager a configurable number of times. If the failure continues, an error can be returned. This timer ensures that settings changes are enforced across a customer's directory.

In some embodiments, a periodic workflow can capture a snapshot of a customer's directory, including each domain controller. This snapshot can be recorded to the event store, and at least one timer can cause these snapshot events to be reviewed. The settings in each snapshot can be compared to the settings corresponding to any events received since the last snapshot was recorded. If all settings in those events are present in the subsequent snapshot, then all settings have been applied. If any settings are missing from the subsequent snapshot, then a new update workflow manager can be called to apply the missing settings to the domain controllers, as discussed above. In some embodiments, if the domain controller update service 103 is in the process of applying a setting change and one or more of the domain controllers fails, then upon recovery of the domain controller a difference (e.g., delta) can be calculated between the settings in the event store and the settings on the domain controller as it is recovered. Any settings which have not been applied to the recovered domain controller can then be applied by the domain controller update service 103 by calling a new update workflow manager 114 which will then call an update workflow for the recovered domain controller, as discussed above.

In some embodiments, the update workflow manager 114 can maintain a domain controllers data store which includes the current settings for each domain controller in a customer's directory service. This data store can be queried by the update workflow manager to determine the current settings that a given domain controller should have. If the domain controller's settings are determined not to match those in the domain controller data store, an update workflow can be called to update the settings of the domain controller. For example, during a recovery event, the current settings on the newly recovered domain controller can be compared to the settings in the domain controller data store. Any difference (e.g., delta) between the current settings and the settings in the data store can then be applied to the newly recovered domain controller using an update workflow, as discussed above.

In some embodiments, domain controller update service 103 may include a retry workflow 126. The retry workflow 126 can monitor event store 116, at numeral 6, to identify any events whose status indicates the corresponding update has failed. If a failure is identified, the retry workflow 126 can invoke update workflow manager 114 at numeral 7 to retry pushing the update to the domain controllers. In some embodiments, there may be a maximum number of retries associated with a given event or with any event in the event store 116, such that if retry workflow invokes the update workflow manager the maximum number of times for an event, any further failures are not retried. In some embodiments, any events which have failed the maximum number of times may be added to a failure queue, or other data structure, for further review by an administrator, customer, or other entity. A retry count may be maintained in the event store for each event to track the number of retry attempts for each event.

In some embodiments, a synchronization manager 128 can periodically (e.g., every hour, day, week, or other configurable amount of time) invoke the update workflow manager 114 to check the settings of each domain controller. The update workflow manager can invoke update workflows 118A-118N to apply the current settings to each corresponding domain controller. As discussed, each update workflow can determine a difference between the settings to be applied and the current settings of each domain controller. If there is no difference, then no changes are made, and the update completes. If a difference is detected, then the update workflow(s) that detected the difference can send a message back to the synchronization manager 128 via the update workflow manager indicating which domain controller(s) were out of sync. The synchronization manager can then generate an alarm to indicate that the domain controller(s) was out of sync, allowing for the domain controller(s) to be further investigated by the customer, a troubleshooting team, or other entity.

Figure 2:
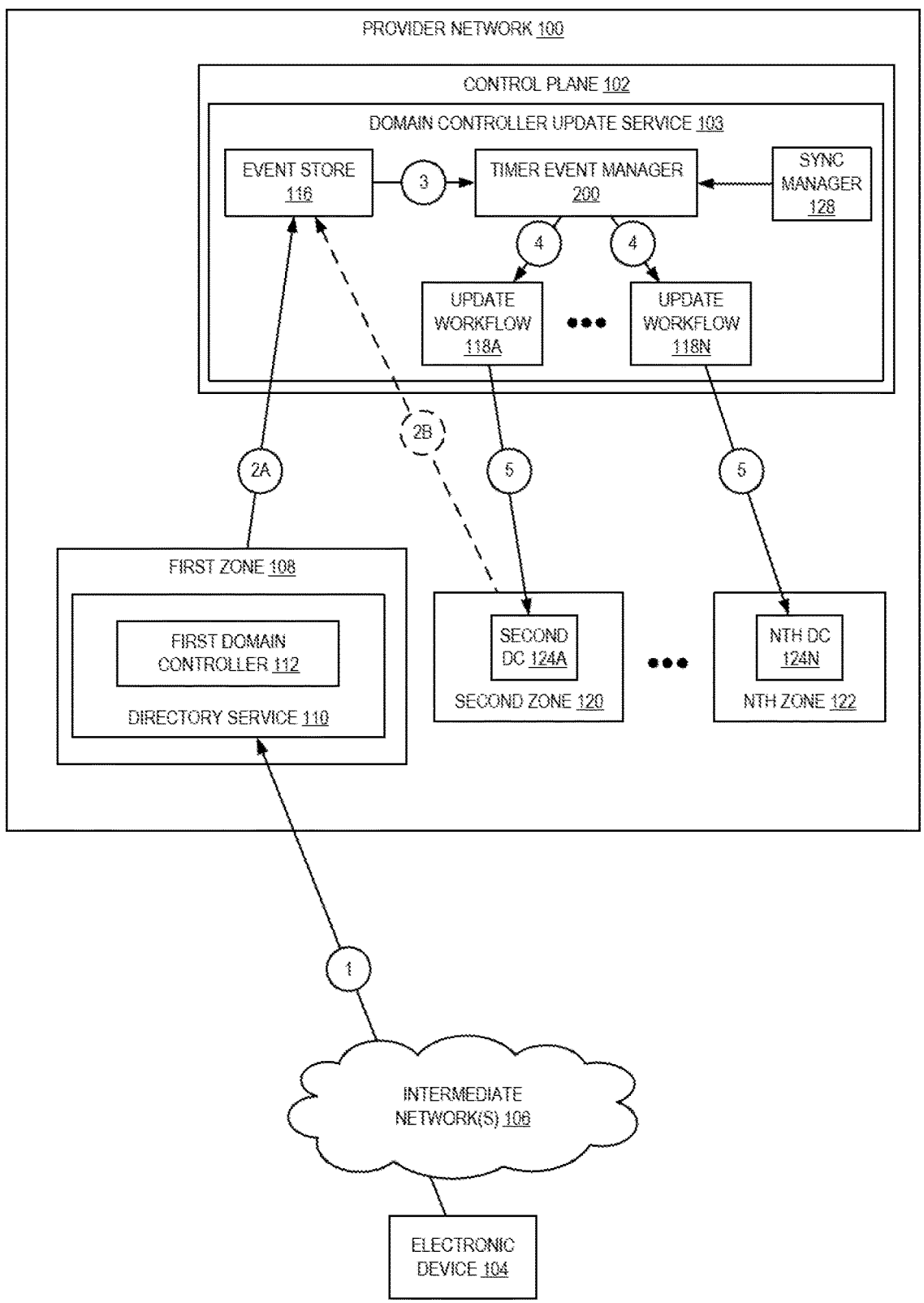
FIG. 2 is a diagram illustrating an alternative environment for pushing domain controller settings to domain controllers in different areas of a provider network according to some embodiments.

FIG. 2 is a diagram illustrating an alternative environment for pushing domain controller settings to domain controllers in different areas of a provider network according to some embodiments. An alternative model for pushing settings changes to domain controllers is shown in the embodiment of FIG. 2. As shown in FIG. 2, event store 116 can collect event data (e.g., corresponding direct and indirect intrusive events) that is generated by the actions of the customer or the directory service. For example, as shown in FIG. 2, at numeral 1, a user may send a request to change one or more settings in their directory service. As discussed, this request may be made using an API. When the API call is executed by the directory service, at numeral 2A, the API call can write an event to event store 116. This event may include event data such as the settings being changed (e.g., represented as a JSON file or other settings file), a retry count for each event, a list of domain controllers to which to apply settings updates (e.g., by IP address or other identifier), the type of event (e.g., direct or indirect), an attempt count, an identifier for the workflow, a start time, and an update status (e.g., running, closed, failed, terminated, etc.). Similarly, as shown at numeral 2B, when an indirect intrusive event occurs, such as disaster recovery, the corresponding workflow can likewise write an event to the event store which includes similar event data. In some embodiments, the indirect intrusive event data may additionally, or alternatively, include an identifier associated with the domain controller which experienced the event, and/or current settings of that domain controller (e.g., in the recovery example).

Timer event manager 200 can periodically poll event store 116 for new intrusive event data at numeral 3. In some embodiments, the timer event manager can identify any intrusive events in the event store that are not indicated as having an active update workflow running on them. Based on the event data associated with such a new intrusive event, the timer event manager can determine a list of domain controllers that need to be updated for that intrusive event. When a new intrusive event is detected, the timer event manager 200 can pull the new settings data from the event data associated with the new intrusive event along with the address data and/or identifiers associated with each domain controller to be updated. At numeral 4, the timer event manager 200 can call an update workflow associated with each domain controller to be updated and provide each update workflow with the settings to be pushed to the corresponding domain controllers. In some embodiments, once the update workflows have been called, the timer event manager 200 can update the status of the intrusive event to indicate that the update is in progress. In some embodiments, the timer event manager may obtain a lock on the domain while the update is in progress. At numeral 5, each update workflow can push the settings associated with the new intrusive event to the corresponding domain controller where the new settings are then applied. If the update is successful, the timer event manager can then remove the intrusive event entry from the data store or mark the event complete. In some embodiments, the timer event manager can release the lock on the domain and set the domain's status to active.

If the update is unsuccessful, the timer event manager can retry the update. For example, the timer event manager can call a new update workflow for any domain controllers for which the update failed. In some embodiments, the timer event manager can retry a configurable number of times before returning an error if the update has still failed.

In some embodiments, the timer event manager 200 can maintain a domain controllers data store which includes the current settings for each domain controller in a customer's directory service. This data store can be queried by the timer event manager to determine the current settings that a given domain controller should have. If the domain controller's settings are determined not to match those in the domain controller data store, an update workflow can be called to update the settings of the domain controller. For example, during a recovery event, the current settings on the newly recovered domain controller can be compared to the settings in the domain controller data store. Any difference (e.g., delta) between the current settings and the settings in the data store can then be applied to the newly recovered domain controller using an update workflow, as discussed above.

In some embodiments, a synchronization manager 128 can periodically invoke the timer event manager 200 to check the settings of each domain controller, similar to the process described above. The timer event manager can invoke update workflows 118A-118N to apply the current settings to each corresponding domain controller. As discussed, each update workflow can determine a difference between the settings to be applied and the current settings of each domain controller. If there is no difference, then no changes are made, and the update completes. If a difference is detected, then the update workflow(s) that detected the difference can send a message back to the synchronization manager 128 via the timer event manager indicating which domain controller(s) were out of sync. The synchronization manager can then generate an alarm to indicate that the domain controller(s) was out of sync, allowing for the domain controller(s) to be further investigated by the customer, a troubleshooting team, or other entity.

Figure 3:
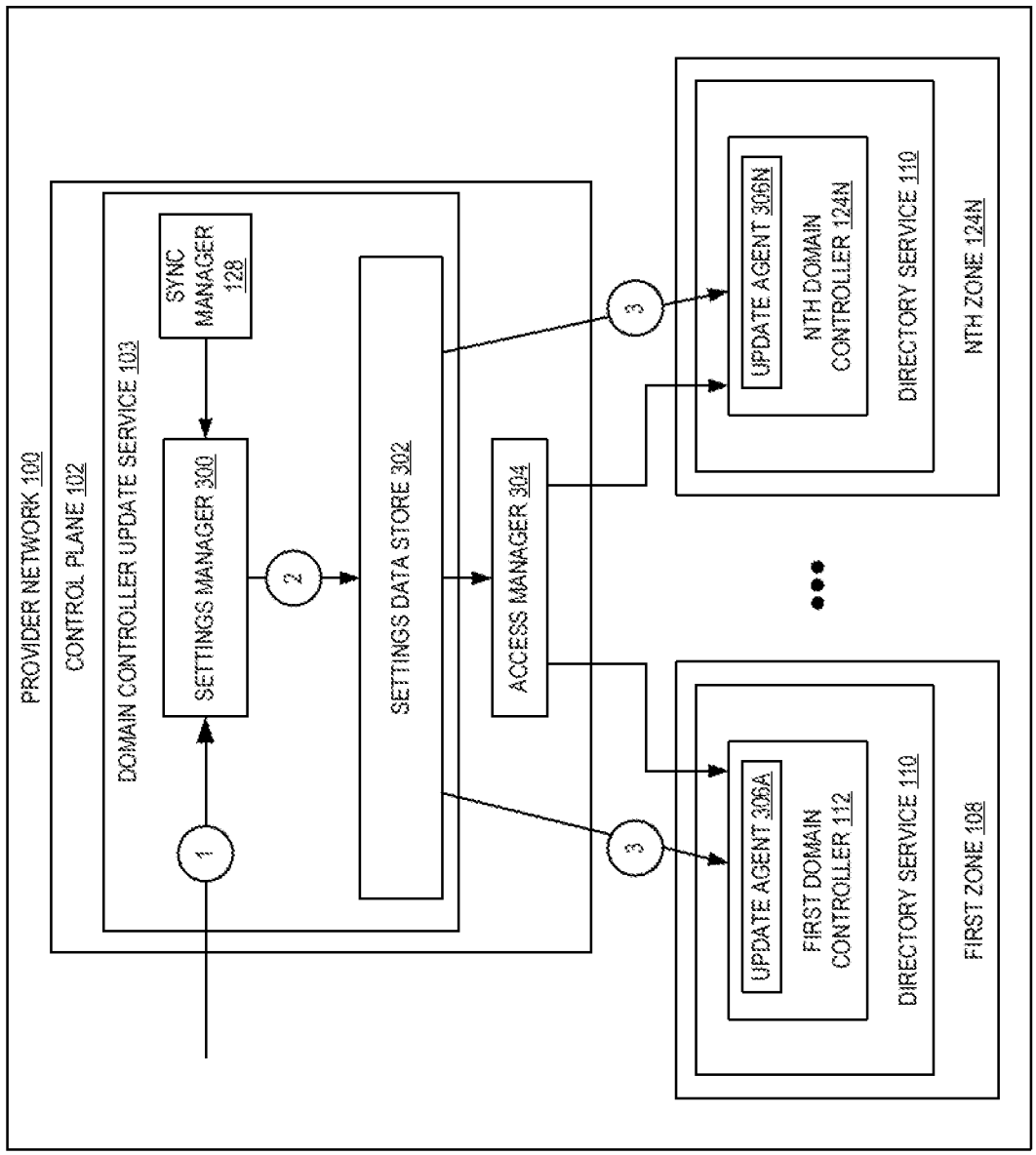
FIG. 3 is a diagram illustrating an environment for pulling domain controller settings to domain controllers in different areas of a provider network according to some embodiments.

FIG. 3 is a diagram illustrating an environment for pulling domain controller settings to domain controllers in different areas of a provider network according to some embodiments. Unlike the above described technique, in which settings changes are pushed to each domain controller, in the example shown in FIG. 3, each domain controller is responsible for pulling settings changes and then applying those changes. As shown in FIG. 3, at numeral 1, an intrusive event is detected by settings manager 300. The intrusive events detected may be similar to those discussed above with respect to FIGS. 1 and 2. Settings manager 300 can add the settings changes, as shown at numeral 2, associated with the intrusive events to a settings data store 302 maintained by the domain controller updated service. Each domain controller in the customer's directory service can include an update agent 306A-306N. At numeral 3, each update agent can periodically poll the settings data store for any settings changes and pull those settings changes to be applied to the domain controllers. In some embodiments, synchronization manager 128 can ensure that each domain controller's settings are up to date with the expected settings maintained by the settings manager, similar to the process discussed above.

In some embodiments, the settings data store 302 may include domain controller settings for a plurality of customers. The settings data store may be organized into a plurality of folders, with one or more folders associated with each customer. Access manager 304 can assign each domain controller an access policy that restricts access to the one or more folders associated with the customer who owns that domain controller. The access policies may provide resource-level authorization, which can prevent a domain controller from accessing settings that are not associated with that domain controller and/or with the customer account associated with that domain controller. This adds a layer of security to prevent a compromised domain controller from reading and/or writing settings it should not have access to.

In the event of disaster recovery, when the recovered domain controller is brought back online, the update agent on that domain controller can pull settings data from the settings data store 302 as part of the startup process. Once the settings data has been received, the update agent can determine whether the settings data is different from the current settings of the recovered domain controller and apply any settings from the settings data that are missing on the recovered domain controller.

Figure 4:
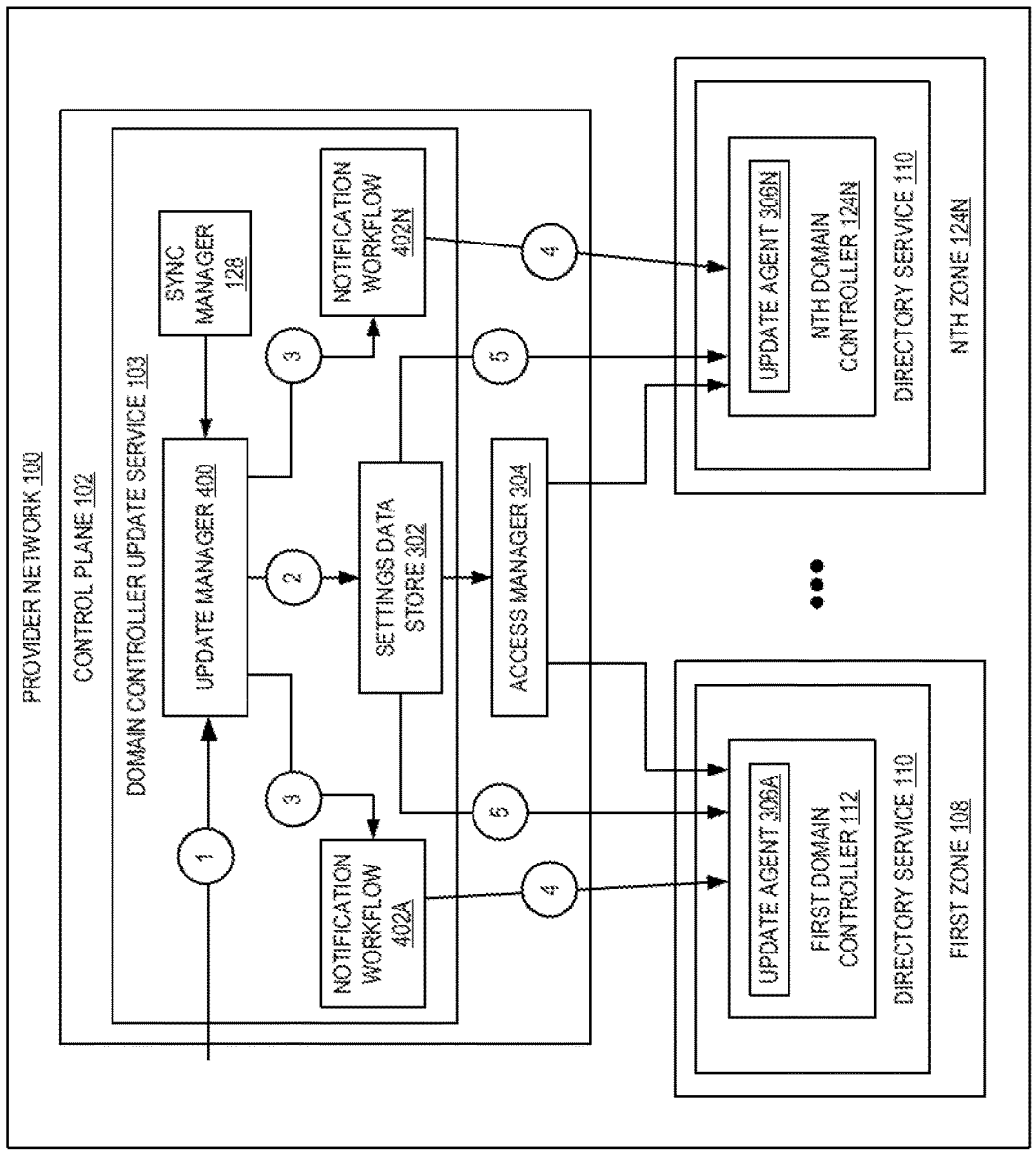
FIG. 4 is a diagram illustrating an environment for replicating domain controller settings to domain controllers in different areas of a provider network according to some embodiments.

FIG. 4 is a diagram illustrating an environment for replicating domain controller settings to domain controllers in different areas of a provider network according to some embodiments. The embodiment shown in FIG. 4 provides a hybrid push/pull model for replicating domain controller settings to multiple domain controllers in a customer's directory. As shown in FIG. 4, at numeral 1, an intrusive event is detected by update manager 400. Update manager 400 can add the settings associated with the intrusive event to settings data store 302. Unlike the example described with respect to FIG. 3, each domain controller is not responsible for periodically pulling the settings data from the settings data store. Instead, at numeral 3, update manager can call a notification workflow 402A-402N for one or more domain controllers that are to update their settings based on the intrusive event. In some embodiments, update manager 400 can determine a list of domain controllers to be notified based on the event data associated with the intrusive event (e.g., based on IP address data, domain controller identifiers, or other identifying information provided in the intrusive event data).

At numeral 4, the notification workflows 402A-402N can provide a notification to corresponding update agents 306A-306N, indicating that there are new settings in the settings data store 302 to be applied to the domain controllers. At numeral 5, the update agents can pull the new settings from the settings data store and apply the settings to their associated domain controllers. In some embodiments, synchronization manager 128 can ensure that each domain controller's settings are up to date with the expected settings maintained by the settings manager, similar to the process discussed above.

In the event of disaster recovery, the recovery process causes an intrusive event to be detected by the update manager 400. The update manager then calls a notification workflow associated with the recovered domain controller which pushes a notification to the recovered domain controller. The recovered domain controller can then pull settings to be applied to the recovered domain controller from the settings data store.

As discussed above with respect to FIG. 3, access manager 304 can provide resource-level authorization policies to ensure that each domain controller only has read and write access to the settings associated with that domain controller and/or with the customer account that owns that domain controller.

Figure 5:
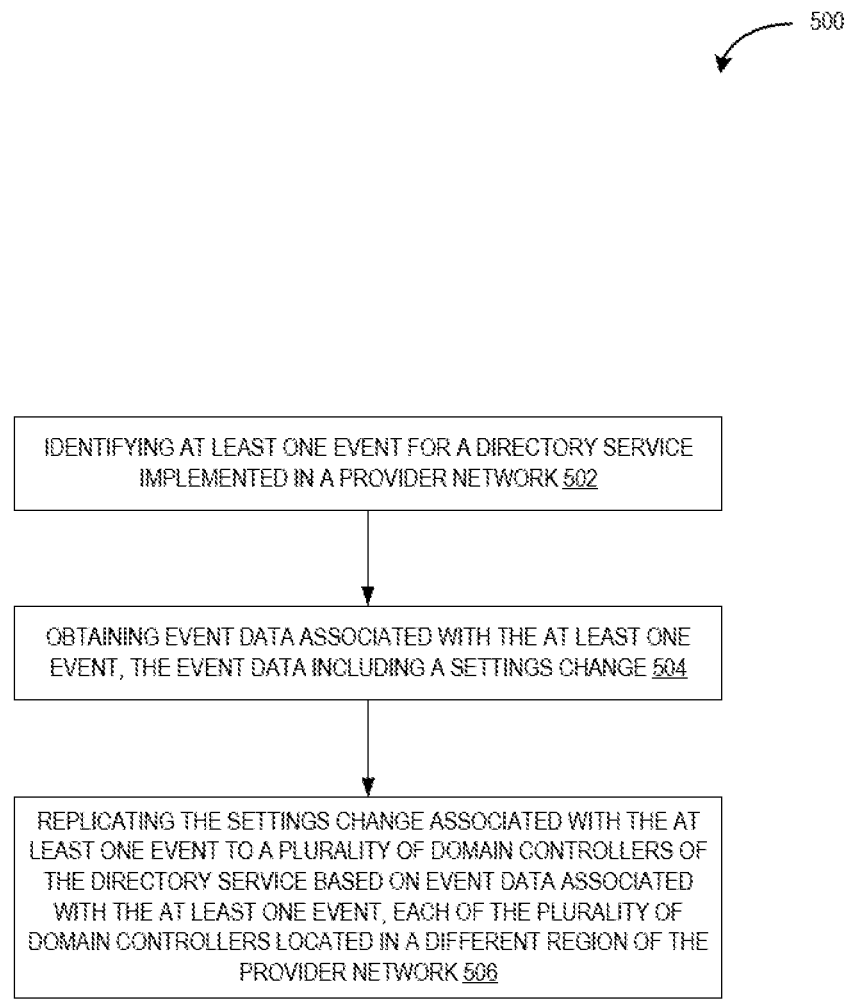
FIG. 5 is a flow diagram illustrating operations of a method for replication of domain controller settings according to some embodiments.

FIG. 5 is a flow diagram illustrating operations 500 of a method for replication of domain controller settings according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by domain controller update service 103 and/or update agents 306A-306N of the other figures.

The operations 500 include, at block 502, identifying at least one event for a directory service implemented in a provider network. In some embodiments, identifying at least one event for a directory service implemented in a provider network, further comprises periodically polling an event store by a timer event manager.

The operations 500 further include, at block 504, obtaining event data associated with the at least one event, the event data including a settings change. In some embodiments, the at least one event includes a first event generated by an application programming interface call received from a customer, and wherein the settings change is replicated to the plurality of domain controllers. In some embodiments, the at least one event includes a second event generated by a second domain controller, and wherein the settings change is replicated to the second domain controller. In some embodiments, the event data includes one or more of the settings change, a list of domain controllers to which to apply settings change, a type of event, a retry count, and an update status.

The operations 500 further include, at block 506, replicating the settings change associated with the at least one event to a plurality of domain controllers of the directory service based on the event data associated with the at least one event, each of the plurality of domain controllers located in a different availability zone of the provider network. In some embodiments, replicating the settings change associated with the at least one event to a plurality of domain controllers of the directory service based on the event data associated with the at least one event, further comprises identifying a list of domain controllers based on the event data, and calling an update workflow corresponding to each domain controller in the list of domain controllers, the update workflow to push the settings update to its corresponding domain controller.

In some embodiments, replicating the settings change associated with the at least one event to a plurality of domain controllers of the directory service based on the event data associated with the at least one event, further comprises calling an update workflow manager by the at least one event, the at least one event comprising an application programming interface call, and calling an update workflow corresponding to each domain controller in a list of domain controllers determined based on the event data, the update workflow to push the settings update to its corresponding domain controller.

In some embodiments, replicating the settings change associated with the at least one event to a plurality of domain controllers of the directory service based on the event data associated with the at least one event, further comprises adding the settings change to a settings data store accessible to the plurality of domain controllers, wherein a first domain controller periodically polls the settings data store for new settings, pulls the settings change from the settings data store, and applies the settings change to the first domain controller. In some embodiments, access to the settings change in the settings data store is controlled by a resource-level access policy.

In some embodiments, replicating the settings change associated with the at least one event to a plurality of domain controllers of the directory service based on the event data associated with the at least one event, further comprises adding the settings change to a settings data store accessible to the plurality of domain controllers, identifying a list of domain controllers based on the event data, and calling a notification workflow corresponding to each domain controller in the list of domain controllers, the notification workflow to push a notification to its corresponding domain controller indicating that the settings change has been added to the settings data store, wherein in response to the notifications each domain controller pulls the settings change from the settings data store, and applies the settings change.

In some embodiments, the operations 500, may include receiving a request to change a setting of at least one domain controller of a directory service implemented in a provider network, the request generated by an application programming interface call, calling an update workflow manager to replicate the changed setting to a plurality of domain controllers of the directory service based on event data, the event data including a settings change and a list of domain controllers to be updated, each of the plurality of domain controllers located in a different availability zone of the provider network; creating an event entry in an event data store associated with the request to change the setting, the event entry including the event data and an update status associated with the event, and calling, by the update workflow manager, a plurality of update workflows, each update workflow corresponding to a domain controller in the list of domain controllers, each update workflow to determine a difference between the settings update and existing settings of its corresponding domain controller and to push the difference between the settings update and the existing settings to its corresponding domain controller.

In some embodiments, the operations may further include monitoring an update status received from each update workflow, determining that the changed setting has been applied to each domain controller from the list of domain controllers, and deleting the event entry from the event data store. In some embodiments, the event data includes an IP address associated with each domain controller in the list of domain controllers, a retry count, and a JavaScript Object Notations representation of the changed setting.

Figure 6:
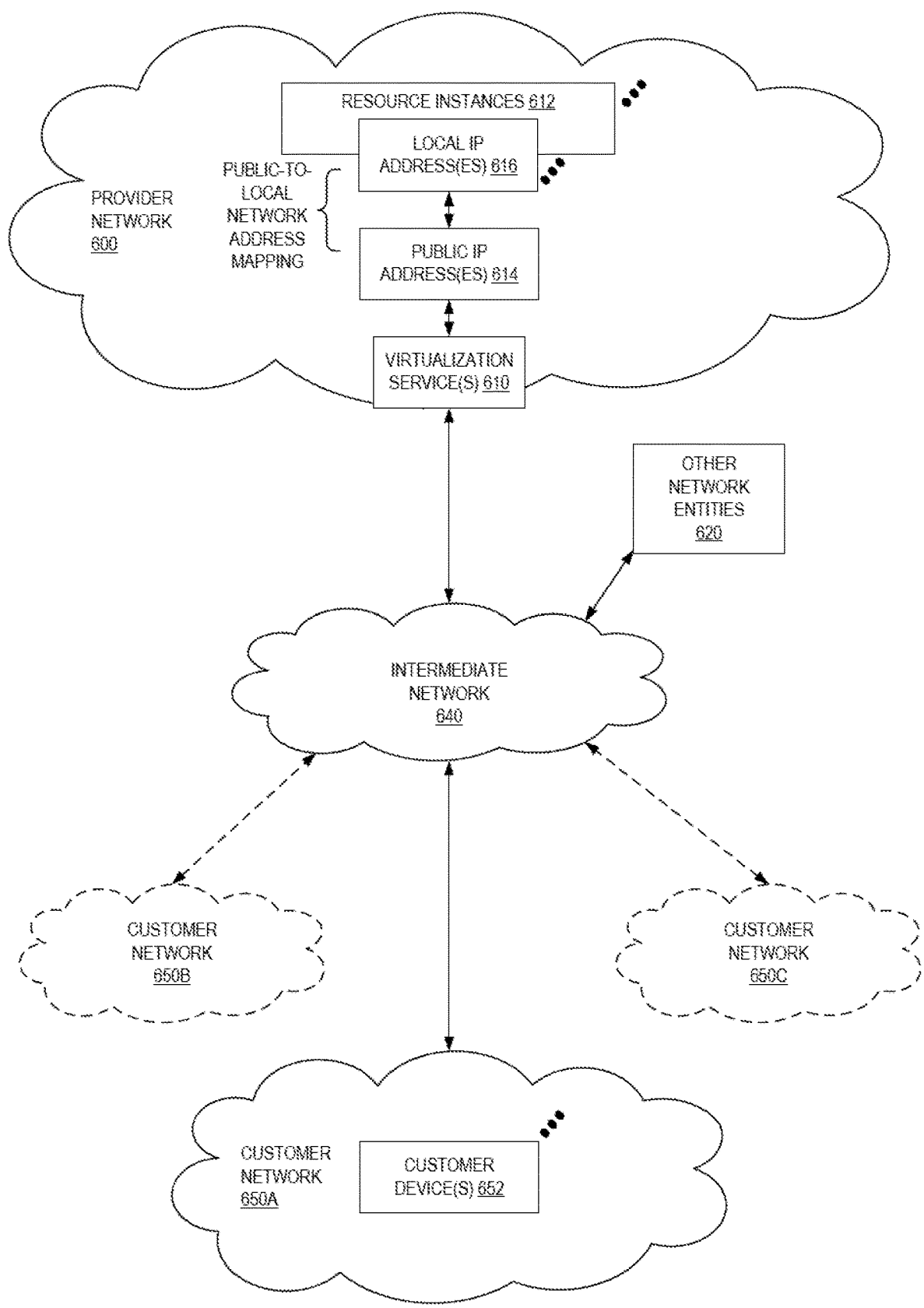
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
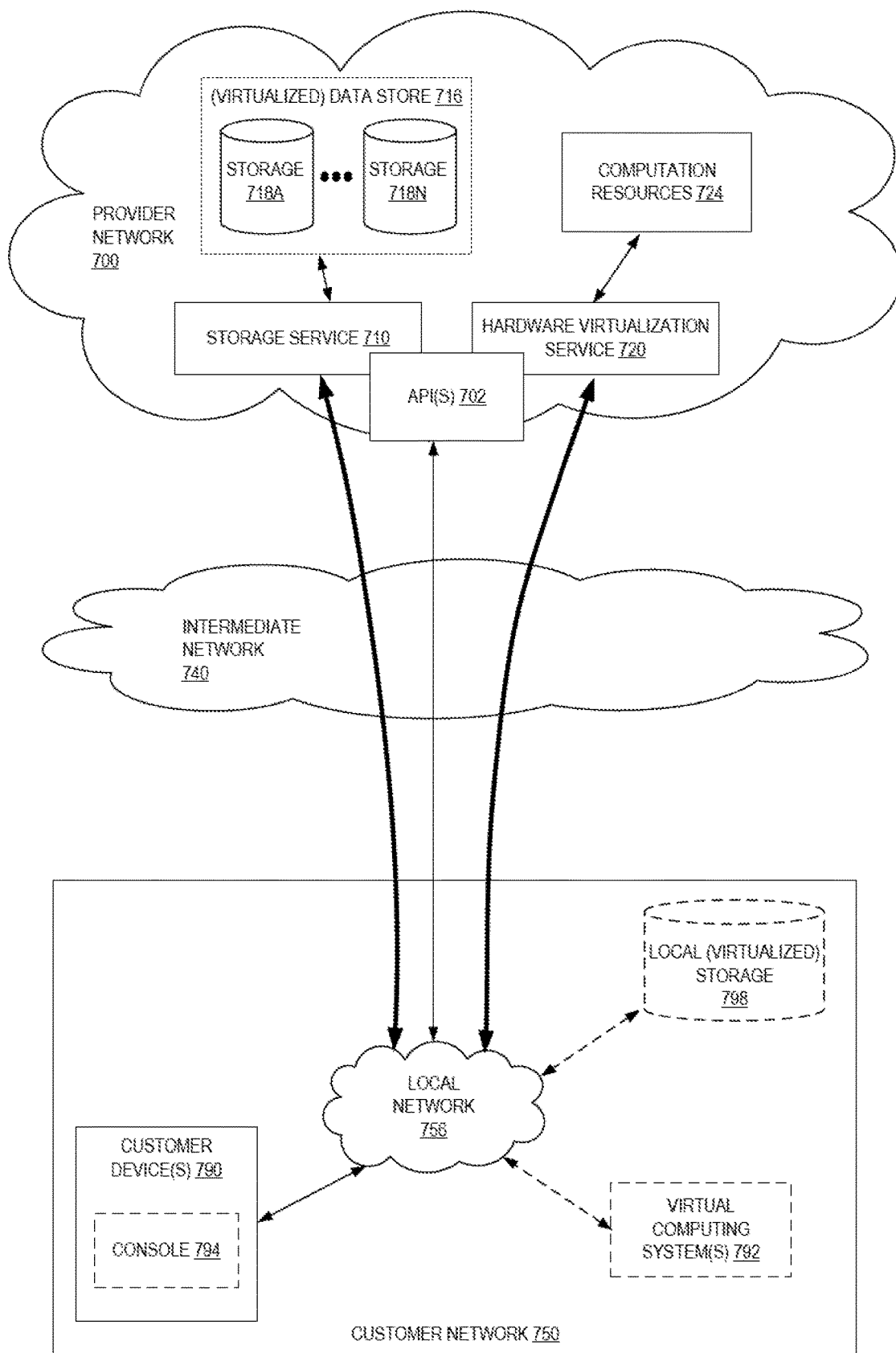
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
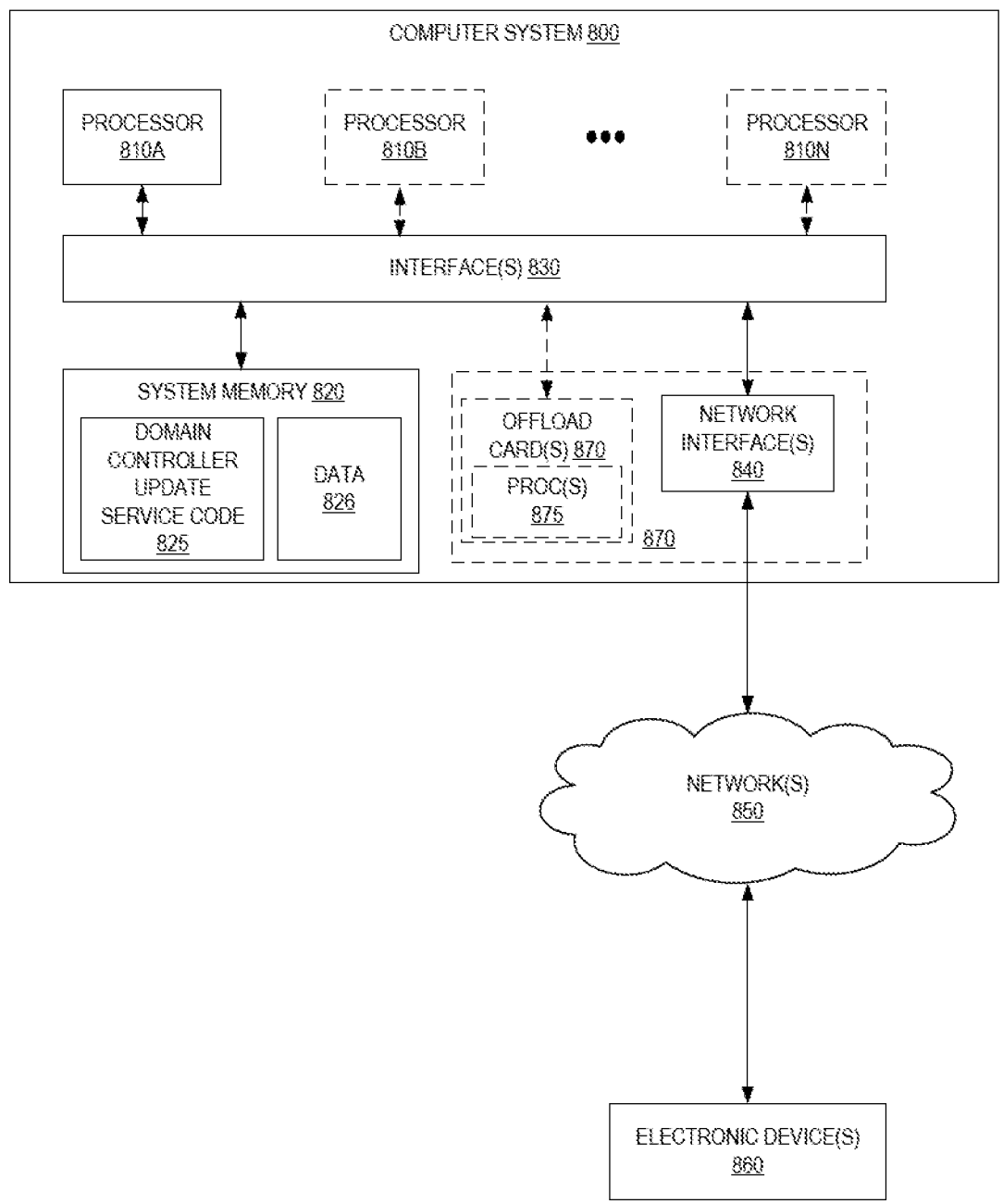
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as domain controller update service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to change a setting of at least one domain controller of a directory service implemented in a provider network, the request generated by an application programming interface call;
calling an update workflow manager to replicate the changed setting to a plurality of domain controllers of the directory service based on event data, the event data including a settings change and a list of domain controllers to be updated, each of the plurality of domain controllers located in a different availability zone of the provider network;

creating an event entry in an event data store associated with the request to change the setting, the event entry including the event data and an update status associated with the request to change the setting; and calling, by the update workflow manager, a plurality of update workflows, each update workflow corresponding to a domain controller in the list of domain controllers, each update workflow to determine a difference between the settings change and existing settings of a corresponding domain controller and to push the difference between the settings change and the existing settings to the corresponding domain controller.

2. The computer-implemented method of claim 1, further comprising:

monitoring an update status received from each update workflow;

determining that the changed setting has been applied to each domain controller from the list of domain controllers; and deleting the event entry from the event data store.

3. The computer-implemented method of claim 1, wherein the event data includes an IP address associated with each domain controller in the list of domain controllers, a retry count, and a JavaScript Object Notations representation of the changed setting.

4. A computer-implemented method comprising:

identifying at least one event for a directory service implemented in a provider network;

obtaining event data associated with the at least one event, the event data including a settings change; and replicating the settings change associated with the at least one event to a plurality of domain controllers of the directory service based on the event data associated with the at least one event, each of the plurality of domain controllers located in a different availability zone of the provider network.

5. The computer-implemented method of claim 4, wherein identifying at least one event for a directory service implemented in a provider network, further comprises:

periodically polling an event store by a timer event manager.

6. The computer-implemented method of claim 5, wherein replicating the settings change associated with the at least one event to a plurality of domain controllers of the directory service based on the event data associated with the at least one event, further comprises:

identifying a list of domain controllers based on the event data; and calling an update workflow corresponding to each domain controller in the list of domain controllers, the update workflow to push the settings change to a corresponding domain controller.

7. The computer-implemented method of claim 4, wherein replicating the settings change associated with the at least one event to a plurality of domain controllers of the directory service based on the event data associated with the at least one event, further comprises:

calling an update workflow manager by the at least one event, the at least one event comprising an application programming interface call; and calling an update workflow corresponding to each domain controller in a list of domain controllers determined based on the event data, the update workflow to push the settings change to a corresponding domain controller.

8. The computer-implemented method of claim 4, wherein replicating the settings change associated with the at least one event to a plurality of domain controllers of the directory service based on the event data associated with the at least one event, further comprises:

adding the settings change to a settings data store accessible to the plurality of domain controllers, wherein a first domain controller periodically polls the settings data store for new settings, pulls the settings change from the settings data store, and applies the settings change to the first domain controller.

9. The computer-implemented method of claim 8, wherein access to the settings change in the settings data store is controlled by a resource-level access policy.

10. The computer-implemented method of claim 4, wherein replicating the settings change associated with the at least one event to a plurality of domain controllers of the directory service based on the event data associated with the at least one event, further comprises:

adding the settings change to a settings data store accessible to the plurality of domain controllers;

identifying a list of domain controllers based on the event data; and calling a notification workflow corresponding to each domain controller in the list of domain controllers, the notification workflow to push a notification to a corresponding domain controller indicating that the settings change has been added to the settings data store, wherein in response to the notification the corresponding domain controller pulls the settings change from the settings data store, and applies the settings change.

11. The computer-implemented method of claim 4, wherein the at least one event includes a first event generated by an application programming interface (API) call received from a customer, and wherein the settings change is replicated to the plurality of domain controllers.

12. The computer-implemented method of claim 11, wherein the at least one event includes a second event generated by a second domain controller, and wherein the settings change is replicated to the second domain controller.

13. The computer-implemented method of claim 12, wherein the event data includes one or more of the settings change, a list of domain controllers to which to apply the settings change, a type of event, a retry count, and an update status.

14. A system comprising:

a first one or more electronic devices implementing a directory service; and a second one or more electronic devices implementing a domain controller update service the domain controller update service including instructions that upon execution cause the domain controller update service to:

identify at least one event for the directory service implemented in a provider network;

obtain event data associated with the at least one event, the event data including a settings change; and replicate the settings change associated with the at least one event to a plurality of domain controllers of the directory service based on the event data associated with the at least one event, each of the plurality of domain controllers located in a different availability zone of the provider network.

15. The system of claim 14, wherein to identify at least one event for a directory service implemented in a provider network, the instructions, when executed, further cause the domain controller update service to:

periodically poll an event store by a timer event manager.

16. The system of claim 15, wherein to replicate the settings change associated with the at least one event to a plurality of domain controllers of the directory service based on the event data associated with the at least one event, the instructions, when executed, further cause the domain controller update service to:

identify a list of domain controllers based on the event data; and call an update workflow corresponding to each domain controller in the list of domain controllers, the update workflow to push the settings change to a corresponding domain controller.

17. The system of claim 14, wherein to replicate the settings change associated with the at least one event to a plurality of domain controllers of the directory service based on the event data associated with the at least one event, the instructions, when executed, further cause the domain controller update service to:

call an update workflow manager by the at least one event, the at least one event comprising an application programming interface call; and call an update workflow corresponding to each domain controller in a list of domain controllers determined based on the event data, the update workflow to push the settings change to a corresponding domain controller.

18. The system of claim 14, wherein to replicate the settings change associated with the at least one event to a plurality of domain controllers of the directory service based on the event data associated with the at least one event, the instructions, when executed, further cause the domain controller update service to:

add the settings change to a settings data store accessible to the plurality of domain controllers, wherein a first domain controller periodically polls the settings data store for new settings, pulls the settings change from the settings data store, and applies the settings change to the first domain controller.

19. The system of claim 18, wherein access to the settings change in the settings data store is controlled by a resource-level access policy.

20. The system of claim 14, wherein to replicate the settings change associated with the at least one event to a plurality of domain controllers of the directory service based on the event data associated with the at least one event, the instructions, when executed, further cause the domain controller update service to:

add the settings change to a settings data store accessible to the plurality of domain controllers;

identify a list of domain controllers based on the event data; and call a notification workflow corresponding to each domain controller in the list of domain controllers, the notification workflow to push a notification to a corresponding domain controller indicating that the settings change has been added to the settings data store, wherein in response to the notification the corresponding domain controller pulls the settings change from the settings data store, and applies the settings change.

\* \* \* \* \*